No. 639,421. Patented Dec. 19, 1899.
P. MAUSER.
RECOIL OPERATED FIREARM.
(Application filed Dec. 27, 1898.)
(No Model.) 5 Sheets—Sheet 1.
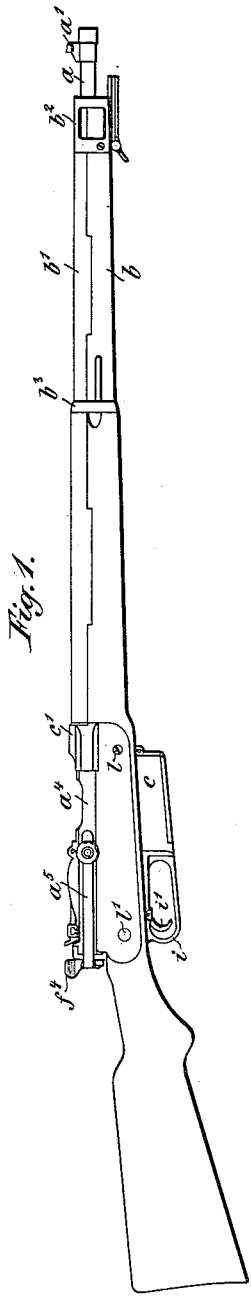
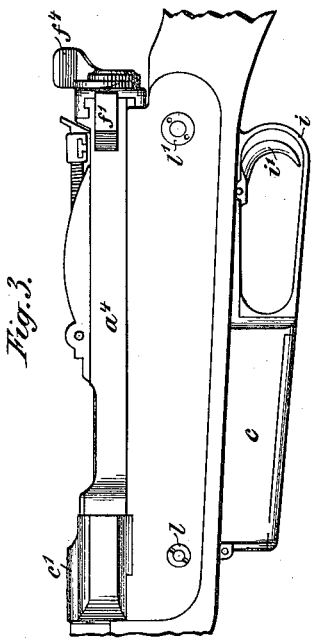
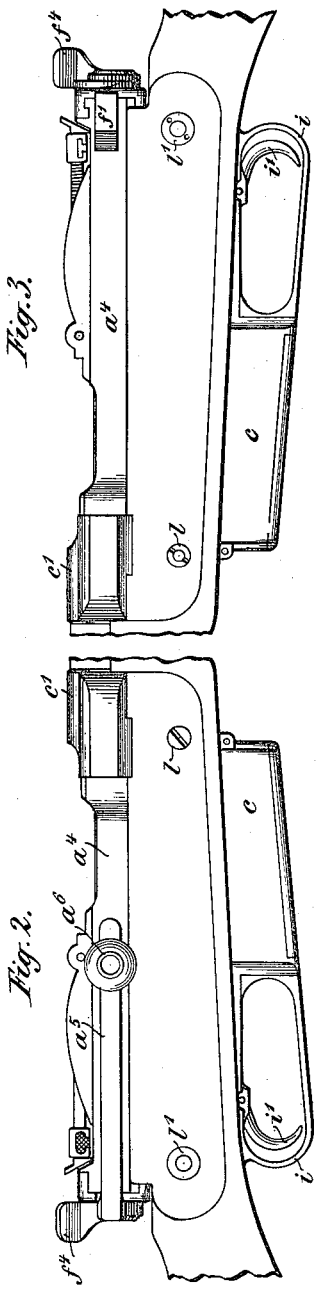
Witnesses:
Inventor.
Paul Mauser.
by Herbert W. T. Jenner
Attorney.

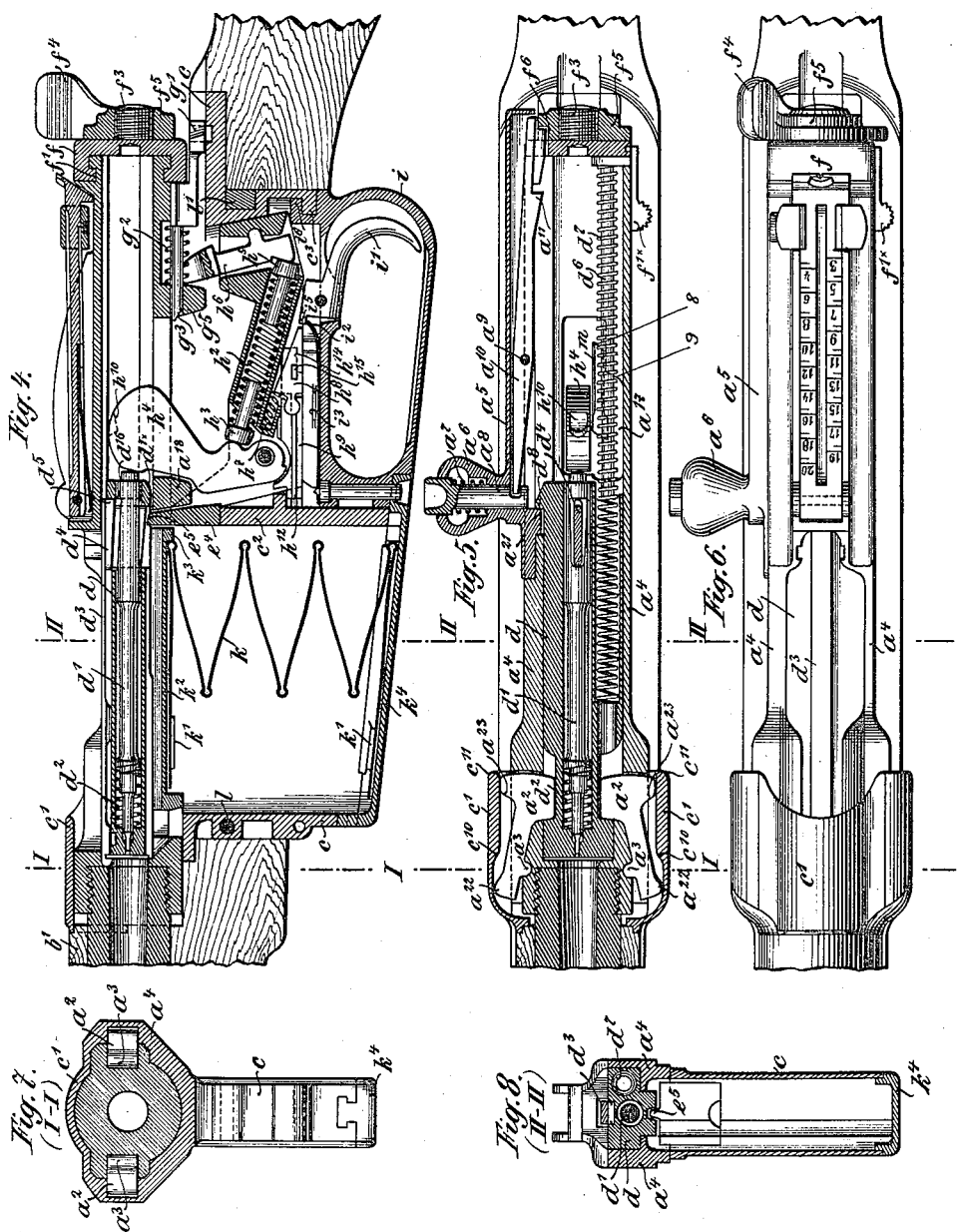

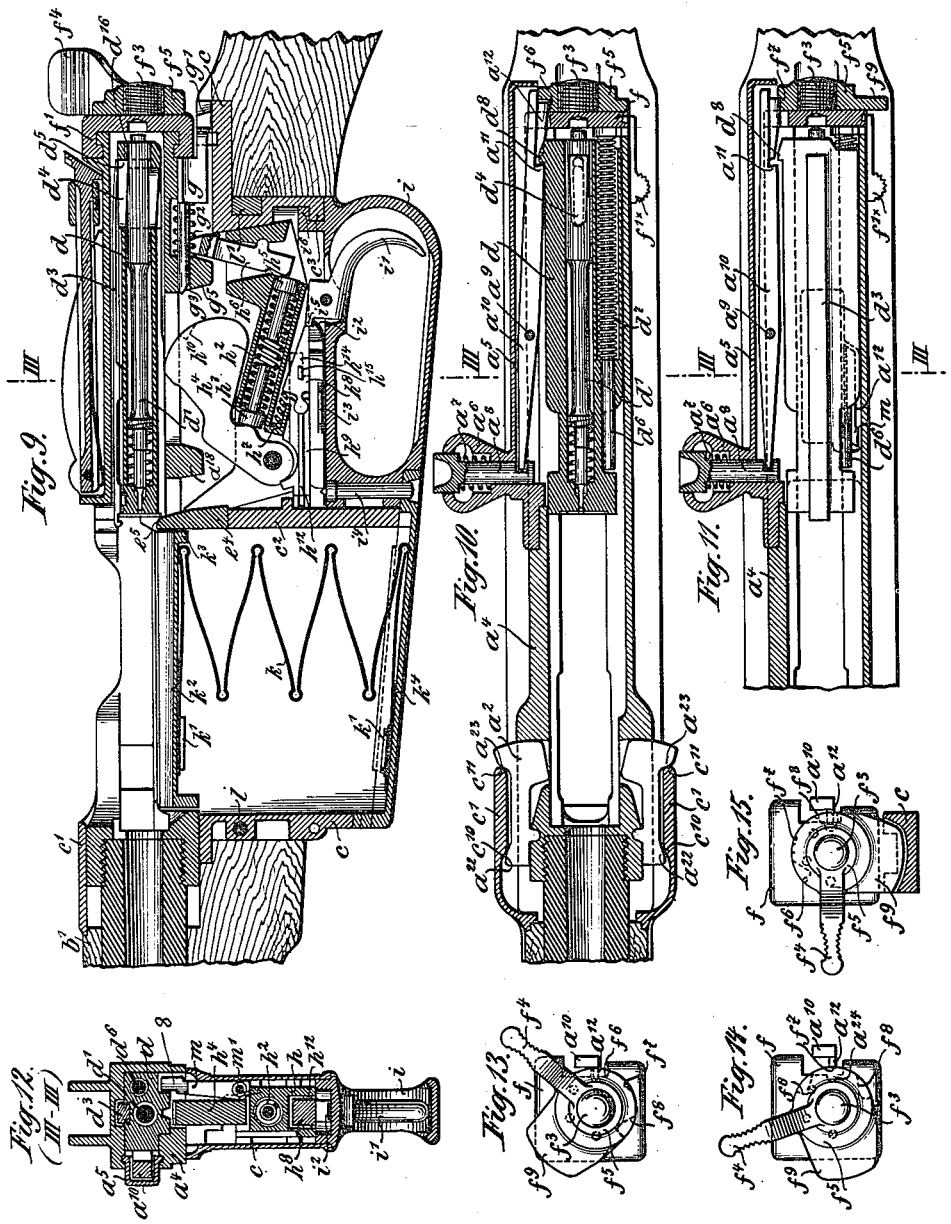

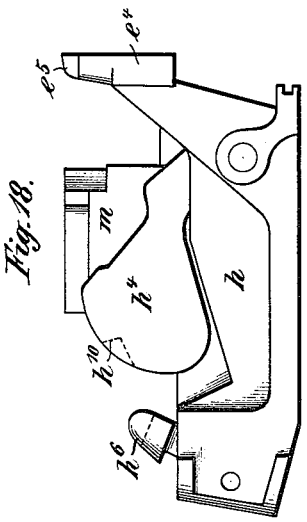
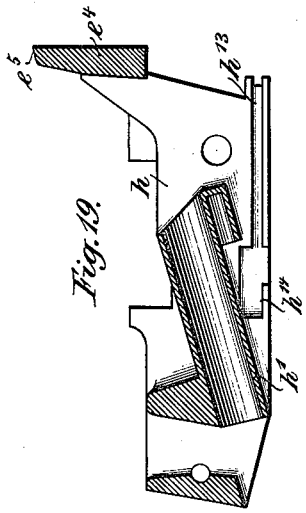
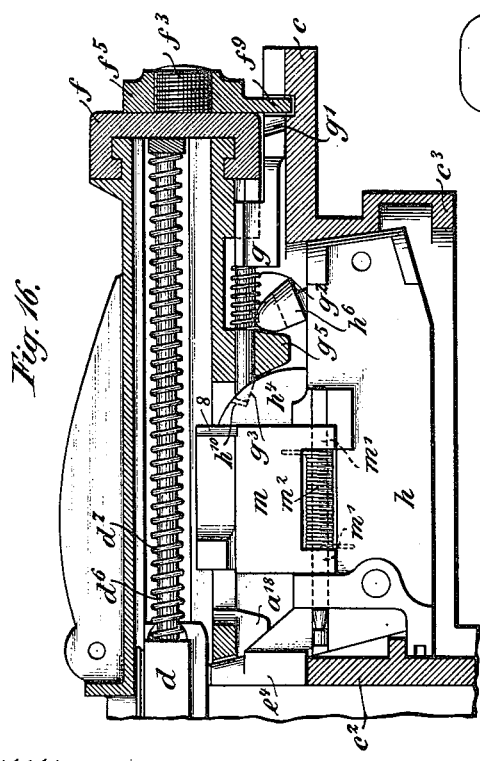
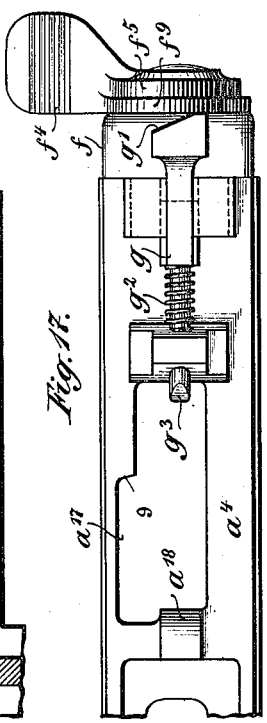

No. 639,421. Patented Dec. 19, 1899.
P. MAUSER.
RECOIL OPERATED FIREARM.
(Application filed Dec. 27, 1898.)
(No Model.) 5 Sheets—Sheet 5.
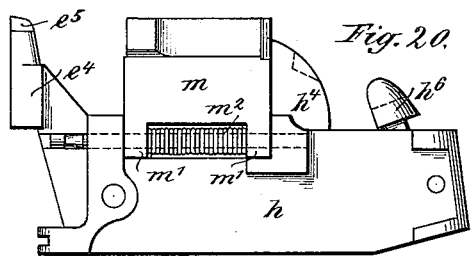
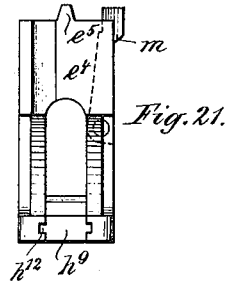
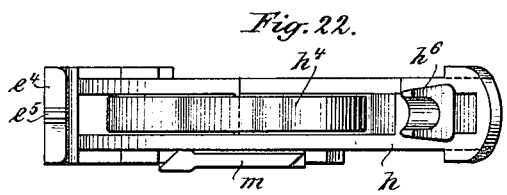
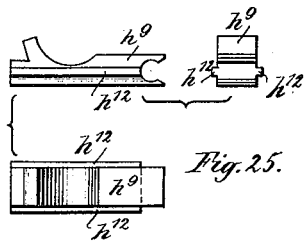
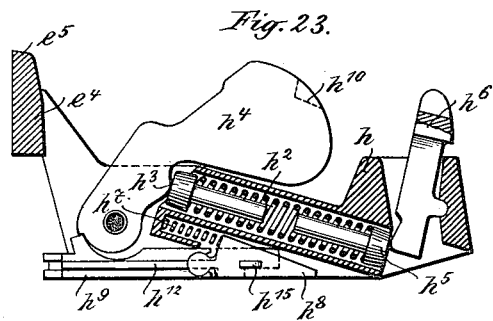
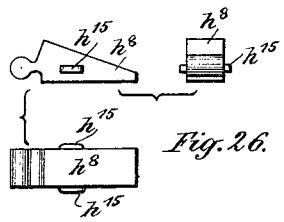
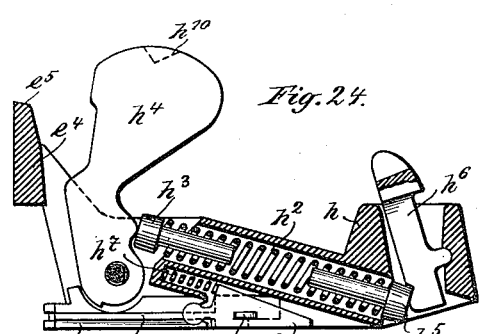
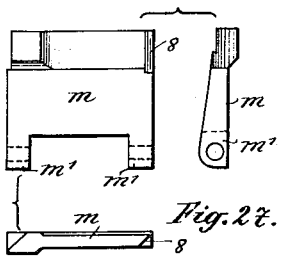
Witnesses:
Inventor.
Paul Mauser,
by Herbert W. Jenner.
Attorney.

UNITED STATES PATENT OFFICE.

PAUL MAUSER, OF OBERNDORF, GERMANY.

RECOIL-OPERATED FIREARM.

SPECIFICATION forming part of Letters Patent No. 639,421, dated December 19, 1899.

Application filed December 27, 1898. Serial No. 700,396. (No model.)

*To all whom it may concern:*

Be it known that I, PAUL MAUSER, a subject of the Emperor of Germany, residing at Oberndorf-on-the-Neckar, in the German Empire, have invented a new and useful self-loading firearm capable of being used as an automatic or as a single-fire weapon, of which the following is a full, clear, and exact description.

This invention relates to firearms; and it consists in the novel construction and combination of the parts hereinafter fully described and claimed.

The principal object of this invention is to construct a firearm which can be fired normally at a prearranged low rate of fire and which can quickly be changed on the word of command and at a critical stage of an action so as to convert it into a rapid-fire, automatic, or self-loading firearm.

In the drawings, Figure 1 is a side view of the firearm. Fig. 2 is a side view of the frame from the right. Fig. 3 is a side view of the frame from the left. Fig. 4 is a longitudinal section through the lock and magazine, showing the breech closed and the weapon discharged. Fig. 5 is a sectional plan view of the parts shown in Fig. 4. Fig. 6 is a plan view of the said parts. Fig. 7 is a cross-section taken on the line I I in Fig. 4. Fig. 8 is a cross-section taken on the line II II in Fig. 4. Fig. 9 is a section similar to that shown in Fig. 4, but shows the breech open and the hammer cocked. Fig. 10 is a sectional plan view of the parts shown in Fig. 9. Fig. 11 is a partial sectional plan view of the lock, showing the parts adjusted for rapid firing. Fig. 12 is a cross-section taken on the line III III in Fig. 9. Figs. 13, 14, and 15 are end views of the safety-catch, showing it in position for single-loading, rapid-firing, and locking, respectively. Fig. 16 is a longitudinal section of portions of the lock, showing the hammer-catch engaging with the hammer. Fig. 17 is a plan view of the hammer-catch. Figs. 18 and 19 are detail views of the lock-frame. Figs. 20, 21, and 22 are detail views of the lock-frame and barrel-catch. Figs. 23 and 24 are detail views of the firing mechanism, showing the hammer in its two positions. Fig. 25 shows detail views of the sear. Fig. 26 shows detail views of the sear-pawl. Fig. 27 shows detail views of the barrel-catch.

The barrel $a$ is slidable longitudinally in the stock $b$, and $b'$ is a removable cover mortised to the stock $b$ over the barrel and secured by rings $b^2$ $b^3$ and a cap $c'$ on the frame $c$. The front end portion of the barrel carries a sight $a'$.

The breech-bolt receiver $a^4$ is screwed to the rear end portion of the barrel, and $a^2$ are locking-dogs pivoted to the receiver by pivots $a^3$ and engaging with recesses in it and in the breech-bolt $d$ when the breech is closed by the said bolt, as shown in Fig. 5. The dogs are provided with projections $a^{22}$ in front of their pivots and projections $a^{23}$ behind their pivots. A magazine case or frame $c$ is secured to the stock and is provided with shoulders $c^{10}$ and $c^{11}$.

When the receiver and barrel are moved forward, the projections $a^{23}$ strike the shoulders $c^{11}$ and pass under them, so that the breech-bolt is locked to the receiver, as shown in Fig. 5. When the receiver and barrel are moved rearward, the projections $a^{22}$ strike the shoulders $c^{10}$, and the breech-bolt is released from the receiver and is permitted to slide back in it, as shown in Fig. 9. The breech-bolt is pressed forward to close the breech by means of a spring $d^7$, mounted on a spring-holder $d^6$ and arranged on one side of the breech-bolt.

The breech-bolt slides longitudinally in the receiver, and $d'$ is the firing-pin, which slides longitudinally in the breech-bolt. A spring $d^2$ inside the front end portion of the breech-bolt engages with a screw-thread on the firing-pin and retracts the firing-pin and prevents it from projecting prematurely from the breech-bolt. This spring slides back and forth with the said pin when the pin is taken out or replaced in the breech-bolt. The spring is less liable to become lost when the firearm is taken apart and does not become stuck in the breech-bolt and require special appliances for extracting it.

A key $d^4$ engages with slots in the breech-bolt and firing-pin and couples the said parts during the loading movements of the weapon. The key is pressed down by a spring $d^3$ and its projecting head $d^5$ bears against the shoulder $d^{16}$ on the firing-pin. The bottom of the key is inclined, and as the breech-bolt is moved forward the bottom of the key strikes the projection $e^5$ on the lock-frame, which raises the said head clear of the shoulder and permits the firing-pin to be driven forward in the breech-bolt by the hammer against the pressure of the spring $d^2$.

A breech-bolt slide $a^5$ is arranged in a slot in the right-hand side of the receiver $a^4$ and is provided with a knob $a^6$ for sliding it back and forth. The said slide is provided with a projection $a^{21}$, which engages with a shoulder $d^8$ on the breech-bolt. An automatic catch $a^{10}$ is pivoted to the said slide by a pin $a^9$ and is provided at its rear part with a ratchet-tooth $a^{11}$ and a tappet $a^{12}$. A push-pin $a^8$ is slidable in the knob against the pressure of a spring $a^7$, and the said push-pin is operatively connected to the front end of the catch $a^{10}$. The catch is set so as to adapt the weapon for rapid firing or for single firing. When the tooth $a^{11}$ is arranged in the path of the shoulder $d^8$, as shown in Figs. 5 and 10, the breech-bolt is arrested each time it is driven backward and must subsequently be released by pressing the push-pin, thus timing the weapon for single firing. When the said tooth is arranged out of the path of the said shoulder, as shown in Fig. 11, the breech-bolt is not arrested and the weapon is adapted for rapid firing. The adjustment of the catch is effected by a safety-catch $f^4$, which is pivoted or screwed on a pin $f^3$, projecting from the end plate $f$ of the receiver. The end plate $f$ is provided with projections which engage with grooves $f'$ on the receiver, and it is held in position by a catch $f'^*$.

The safety-catch has a disk $f^5$, provided with two deep notches $f^6$ and $f^8$ and a shallow notch $f^7$, between the deep notches, for the tappet $a^{12}$ to engage with. When the safety-catch is turned to the right, as shown in Figs. 10 and 13, the tappet enters the deep notch $f^6$, and the breech-bolt is arrested at the end of each rearward movement. When the safety-catch is placed in its middle position, as shown in Figs. 11 and 14, the tappet engages with the shallow notch and the breech-bolt is not arrested. When the safety-catch is turned to the left, as shown in Fig. 15, the tappet engages with the deep notch $f^8$ and the breech-bolt is arrested, as before, and, in addition, a projection $f^9$ on the catch engages the inclined end portion $g'$ of the hammer-catch $g$ and thrusts it forward. The projection also enters a groove in the frame $c$.

The hammer $h^4$ is pivoted in the lock-frame $h$, which is supported in the frame $c$. The hammer-catch slides in a lug $g^5$ on the under side of the receiver and is provided with a point $g^3$, which engages with a notch $h^{10}$ in the hammer when the hammer is cocked and the hammer-catch is pushed forward. A spring $g^2$ is provided for retracting the hammer-catch. When the hammer-catch and the safety-catch are operated, the hammer is locked to the receiver and the receiver is locked to the frame $c$, which is secured to the stock of the weapon, so that the barrel cannot slide.

In order to retain the barrel (together with the receiver) in its rearward position independent of the safety-catch, and after firing a shot, until the breech-bolt has been moved forward and has pushed the cartridge at the top of the magazine into the barrel, a barrel-catch $m$ (see Fig. 16) is pivoted on a pin $m'$, arranged longitudinally in the lock-frame $h$. This catch is moved laterally outward into a recess $a^{17}$ in the receiver by its spring $m^2$ when the receiver is moved backward with the barrel. When the breech-bolt is retracted, it locks the catch in the recess, as shown in Fig. 12.

When the breech-bolt slides forward into the position shown in Fig. 5, it moves past the barrel-catch $m$, which is then pushed laterally out of the recess by the receiver as it slides forward after the breech-bolt has completed its forward movement. Inclined surfaces 8 and 9 are provided on the catch $m$ and on the receiver at one end of the recess, so that the receiver-operating mechanism overcomes the pressure of the spring $m^2$.

A pusher $h^6$ is pivoted in the lock-frame $h$, and its upper end bears against the lug $g^5$ and operates to push forward the receiver and barrel. A guide-chamber $h'$ for the spring and pistons is arranged in the lock-frame in an upwardly and forwardly inclined position and contains a spiral spring $h^2$. A piston $h^3$ engages with one end of the spring and operates against the hammer, and a piston $h^5$ engages with the other end of the spring and operates against the pusher. The sear-spring $h^7$ is arranged in a chamber under the chamber $h'$. The sear-spring bears against the sear-pawl $h^8$, which is articulated to the sear $h^9$. The sear has two guide-ribs $h^{12}$, which slide in grooves $h^{13}$ in the lock-frame, (see Fig. 19,) and $h^{14}$ are lugs in rear of the said grooves for the lugs $h^{15}$, which project from the sides of the sear-pawl, to slide on.

The trigger $i'$ is pivoted to the trigger-guard $i$ and is provided with a nose $i^5$. This nose is normally pushed upward and rearward by the trigger-spring $i^2$, which is held against the top of the trigger-guard by lugs $i^3$, projecting from the frame $c$. The trigger-spring also holds the retractible bolt $i^4$ in engagement with the bottom plate of the magazine.

The magazine is arranged under the breech. The feed-plate $k^2$ and the bottom plate $k^4$ are provided with lugs $k'$ near their front ends, and $k$ is a zigzag spring arranged in the rear part of the magazine and provided with forwardly-projecting end portions which engage with the lugs $k'$. When the spring is used, the rear ends of the cartridges are raised higher and with greater pressure than their front ends, which is very desirable in a rapid-fire weapon, as it insures the rear end of each cartridge being brought to its position in the path of the breech-bolt before the breech-bolt strikes it.

The magazine frame or case $c$ is connected to the stock by bolts or screws $l$ $l'$, and the front portion $e^4$ of the lock-frame is placed over the rear wall $c^2$ of the magazine. The rear nose $i^6$ of the trigger-guard engages with a projection $c^3$ on the frame $c$, and all the parts are finally secured by inserting the bottom plate of the magazine.

The weapon is operated as follows: When required for rapid firing, the safety-catch is placed in its middle position and the breech-bolt is drawn back by the knob $a^6$ until its front end is engaged by the stop $k^3$ on the rear end of the cartridge-supply plate of the magazine, which has risen in front of the breech-bolt under the action of its spring $k$, and the knob is pushed forward to its original position. In drawing back the breech-bolt the hammer is cocked partly by the projection $a^{18}$ on the breech-bolt slide and partly by the shoulder $d'^*$ on the breech-bolt. The magazine is then filled with cartridges by means of a cartridge-holder of approved construction. When the empty holder is removed from the magazine, the breech-bolt is pressed forward by its spring $d^7$, and the receiver and barrel are pressed forward by the pusher $h^6$, so that the top cartridge is pushed into the barrel and the weapon is in a proper condition to be fired. The weapon is fired by the trigger, which presses the sear-pawl and sear forward by means of its nose. The hammer is disengaged when the sear is pushed forward and is then operated by its spring $h^2$, so that it strikes the rear end of the firing-pin and drives it against the cap of the cartridge, so that the cartridge is exploded. The barrel and breech-bolt first recoil together. The locking-dogs (by the lugs $a^{22}$ engaging the shoulders $c^{10}$, which forces out their rear ends) then unlock the breech-bolt, which continues to move back under its required momentum, and the barrel-catch enters the recess $a^{17}$ and temporarily locks the barrel and receiver to the stock. The empty cartridge-shell is ejected in the usual manner when the breech-bolt is driven rearward. The rearward motion of the breech-block also cocks the hammer, which is held cocked by the sear. The breech-bolt having completed its rearward movement is at once pushed forward by its spring, and as soon as the breech-bolt is clear of the barrel-catch the receiver and barrel are pushed forward by the spring-operated pusher, which overcomes the pressure of the barrel-catch spring. The weapon can be fired as rapidly as the trigger can be pulled, the speed depending upon the skill of the operator.

When for tactical reasons the rate of firing is to be approximated to that of a single-firing weapon, the safety-catch is placed in the position shown in Fig. 13. The forward motion of the breech-bolt is now arrested at the end of each recoil, and the breech-bolt cannot move forward until it has been released from the pivoted catch by pressing the push-pin $a^3$. As it takes a certain amount of time to operate the push-pin before pulling the trigger, the rate of firing is diminished to a substantially predetermined extent.

When blank cartridges are fired, the breech-bolt must be retracted by hand.

What I claim is—

1. In a firearm, the combination, with a slidable breech-bolt, of an automatic catch for retaining the said bolt when slid back, a safety-catch for placing the said automatic catch out of action, and means for disengaging the automatic catch from the breech-bolt independent of the safety-catch, substantially as set forth.

2. In a firearm, the combination, with a slidable breech-bolt, of a pivoted catch for retaining the said bolt automatically when slid back, a safety-catch engaging with one end of the pivoted catch and operating to place it into or out of action, and means for disengaging the pivoted catch from the breech-bolt engaging with the opposite end of the pivoted catch and operating independently of the safety-catch, substantially as set forth.

3. In a firearm, the combination, with a frame, a receiver slidable in the frame, and a breech-bolt slidable in the receiver; of an automatic catch for retaining the said bolt when slid back, and a safety-catch operating to place the said automatic catch out of action and to lock the said receiver to the said frame, substantially as set forth.

4. In a firearm, the combination, with a slidable breech-bolt, and a pivoted hammer; of an automatic catch for retaining the said bolt when slid back, a hammer-catch for locking the hammer when cocked, and a safety-catch operating to place the said automatic catch out of action and to move the hammer-catch into engagement with the hammer, substantially as set forth.

5. In a firearm, the combination, with a frame, a receiver slidable in the frame, and a breech-bolt slidable in the receiver; of an automatic catch for retaining the said bolt when slid back, a hammer-catch for locking the hammer when cocked, and a safety-catch operating to place the said automatic catch out of action, to lock the said receiver to the said frame, and to move the hammer-catch into engagement with the hammer, substantially as set forth.

6. In a firearm, the combination, with a receiver, and a breech-bolt slidable therein; of an automatic catch arranged at one side of the receiver and operating to retain the said bolt when slid back, and a safety-catch pivoted to the rear end of the receiver and operating to place the automatic catch in and out of action, substantially as set forth.

7. In a firearm, the combination, with a frame provided with a groove and secured to the stock, a receiver slidable in the said frame, and a hammer; of a hammer-catch carried by the receiver and operating to lock the hammer when cocked, and a safety-catch pivoted to the end of the receiver and provided with a projection which interlocks with the said groove and moves the hammer-catch into engagement with the hammer, substantially as set forth.

8. In a firearm, the combination, with a receiver, and a breech-bolt slidable therein; of an automatic catch pivoted on one side of the receiver and operating to retain the said bolt when slid back, and a safety-catch pivoted to the end of the receiver and normally holding the automatic catch out of action, said safety-catch having a notch for receiving one end portion of the automatic catch when in action and for moving it out of action, substantially as set forth.

9. In a firearm, the combination, with a frame provided with shoulders, a receiver slidable in the said frame, and a breech-bolt slidable in the said receiver; of locking-dogs having their middle portions pivoted to the receiver and locking it to the breech-bolt when the said parts are slid forward, said dogs being operated positively in each direction by the said shoulders, substantially as set forth.

10. In a firearm, the combination, with a frame, a receiver slidable in the said frame, and a breech-bolt slidable in the said receiver; of locking devices securing the breech-bolt to the receiver when the said parts are slid forward, means for sliding the said parts forward, and a catch operating to prevent the receiver from being slid forward until after the breech-bolt has been slid forward, substantially as set forth.

11. In a firearm, the combination, with a breech-bolt, and a firing-pin slidable therein; of a key slidable in slots in the said bolt and pin and provided with a projecting head for holding the said pin retracted in the said bolt, and means for sliding the said key so as to permit the firing-pin to slide in the breech-bolt, substantially as set forth.

12. In a firearm, the combination, with a slidable breech-bolt, and a firing-pin slidable therein; of a key slidable in slots in the said bolt and pin and provided with an inclined portion and a projecting head for holding the said pin retracted in the said bolt, and a projection arranged in the path of the said inclined portion, whereby the key is slid in the slots to release the firing-pin as the breech-bolt is slid forward, substantially as set forth.

13. In a firearm, the combination, with a receiver, and a breech-bolt slidable therein and provided with a shoulder; of a slide in the receiver provided with a projection engaging with the said shoulder and affording a means for retracting the breech-bolt by hand, and an automatic catch pivoted to the said slide and engaging with the said shoulder when the slide is in its normal position and the breech-bolt is slid back, substantially as set forth.

14. In a firearm, the combination, with a receiver, and a breech-bolt slidable therein; of a slide in the receiver engaging with the breech-bolt, an operating-knob on the slide, a catch pivoted in the slide and provided with a ratchet-tooth at its rear end for holding the breech-bolt when retracted, a spring-operated push-pin slidable in the knob and engaging with the front end of the said catch, and means for holding the breech-bolt when retracted by the slide until the slide is restored to its normal position and the said catch engages with the breech-bolt, substantially as set forth.

15. In a firearm, the combination, with a frame secured to the stock, and a laterally-movable spring-pressed catch pivoted to the said frame; of a slidable breech-bolt receiver provided with a recess with which the said catch engages when the receiver is slid back, and a slidable breech-bolt which locks the catch in the said recess when retracted and frees it when slid forward, substantially as set forth.

16. In a firearm, the combination, with a frame secured to the stock, a trigger, and a sliding sear; of a slidable breech-bolt receiver and barrel rigidly secured together, a pusher pivoted at its middle part in the rear part of the said frame and having its upper part operatively connected with the receiver, and a spring-pressed piston carried by the middle part of the said frame and bearing against the lower part of the pusher below its pivot, whereby the receiver and barrel are slid forward, substantially as set forth.

17. In a firearm, the combination, with a lock-frame, and a spring-pressed hammer pivoted therein; of a sear slidable in the frame under the hammer, a sear-pawl articulated to the sear, a trigger for operating the sear-pawl, and a spring for retracting the sear-pawl and sear, substantially as set forth.

18. In a firearm, the combination, with a lock-frame provided with supports for the sear-pawl and guides for the sear, and a spring-pressed hammer pivoted in the said frame; of a sear slidable in the said guides, a sear-pawl articulated to the sear and provided with lugs which rest on the said supports, a trigger for operating the sear-pawl, and a spring for retracting the sear-pawl and sear, substantially as set forth.

19. In a firearm, the combination, with a lock-frame provided with an upwardly and forwardly inclined guide-chamber, a trigger, and a sliding sear; of a hammer pivoted to the front part of the frame below the front end of the chamber, a spring-pressed piston bearing against the hammer above its pivot, a barrel-pusher pivoted in the rear part of the frame above the rear end of the chamber, and a spring-pressed piston bearing on the said pusher below its pivot, said pistons being arranged in the said chamber, substantially as set forth.

In testimony whereof I affix my signature in presence of two witnesses.

PAUL MAUSER.

Witnesses:
WALDEMAR HAUPT,
EMIL L. GOLDSCHMIDT.